United States Patent [19]
Roesner et al.

[11] Patent Number: 5,951,065
[45] Date of Patent: Sep. 14, 1999

[54] QUICK CONNECTOR WITH VARIABLE LENGTH COMPENSATION

[75] Inventors: Thomas Wilhelm Roesner, Bensberg; Dietmar Boehme, Duisburg; Christof Kock, Cologne, all of Germany

[73] Assignee: Ford Motor Company, Dearborn, Mich.

[21] Appl. No.: 09/152,317

[22] Filed: Sep. 14, 1998

[30] Foreign Application Priority Data

Sep. 13, 1997 [DE] Germany .................... 197 40 356

[51] Int. Cl.⁶ ...................................... F16L 39/02
[52] U.S. Cl. .................... 285/318; 285/302; 285/351
[58] Field of Search .................. 285/244, 318, 285/319, 321, 298, 302, 351

[56] References Cited

U.S. PATENT DOCUMENTS

| | | | |
|---|---|---|---|
| 4,055,359 | 10/1977 | McWethy | 285/318 |
| 4,606,564 | 8/1986 | Kurachi | 285/244 |
| 4,632,434 | 12/1986 | Proctor et al. | 285/318 |
| 5,002,314 | 3/1991 | Smith | 285/318 |
| 5,364,131 | 11/1994 | Hartsock et al. | 285/318 |
| 5,425,558 | 6/1995 | Dennany, Jr. | 285/318 |
| 5,738,384 | 4/1998 | Boehme | 285/114 |

FOREIGN PATENT DOCUMENTS 2205137   11/1988   United Kingdom ............. 285/318

*Primary Examiner*—Eric K. Nicholson
*Attorney, Agent, or Firm*—Raymond L. Coppiellie

[57] ABSTRACT

In a quick-fitting pipe union for sealingly connecting two pipes (1 and 4) comprising an annular cage (8) fitted on the outer side of the one pipe (4) and fitted inside with an annular helical spring (9). When the pipes (1 and 4) are slid axially into one another, the spring latches over a flange (2) of the receiving pipe (1). The annular cage (8) with the sealing means (6/7) is fitted after the enlargement (5) is loosely slidable relative to the receiving pipe.

4 Claims, 1 Drawing Sheet

QUICK CONNECTOR WITH VARIABLE LENGTH COMPENSATION

BACKGROUND OF THE INVENTION

1. Field of the Invention

The invention relates to a quick-fitting pipe union for sealingly connecting two pipes. More particularly, the present invention relates to a quick connect fitting comprising an annular cage with an annular helical spring fitted on the outer side of one pipe which, when slid axially into another pipe, latches over a flange and connects the two pipes together.

2. Disclosure Information

German patent specification DE 26 52 207 discloses a quick-fitting pipe union for sealingly connecting two pipes comprising a cage fitted on the outer side of the one pipe and having an annular helical spring fitted therein which serves to hold the second pipe on a flange when the pipes are slid into one another. The seal between the two telescoped pipes is obtained by an O-ring arrangement, and by means of the cage, which in this known quick-fitting union is fixed axially on one pipe, the two pipes are also secured against accidental separation from one another. This type of quick-fitting pipe union is also know as a spring lock coupling.

Quick-fitting pipe unions of this kind are increasingly being used in motor vehicles to connect the various coolant pipelines of air-conditioning installations. Accordingly, when there are several models of vehicle a large number of corresponding sections of pipe with corresponding quick-fitting pipe unions have hitherto had to be stocked to provide for the necessary adaptation to the fitting space.

The invention proceeds from the observation that many such pipe components which have to be stocked only differ from one another by small differences in length, and that as a rule, in fitting these pipe components in the vehicle, after assembly has been completed, with the necessary adjustments in length, the pipe components are fixed in such a way that accidental axial separation is hardly possible. The risk of complete separation after the maximum adjustment of length has taken place is reduced by the enlargement of the inserted pipe.

The object of the invention is therefore to modify the known quick-fitting pipe union in such a way so as to provide a considerable amount of length adjustment.

SUMMARY OF THE INVENTION

According to the invention this object is achieved in a quick-fitting pipe union of the kind referred to above having an annular cage fitted on the one pipe and carrying the annular helical spring which is loosely axially slidable on the outer circumference of the pipe.

Since the quick-fitting pipe union of the invention makes a considerable adjustment in length possible when connecting two pipes, the total number of different pipe components which have to be stocked, e.g. for the installation of an air-conditioning plant in a motor vehicle, can be considerably reduced.

BRIEF DESCRIPTION OF THE DRAWINGS

The invention will now be described in more detail, by way of example, with reference to an embodiment shown in the accompanying drawings, in which.

DETAILED DESCRIPTION OF A PREFERRED EMBODIMENT

Figure 1:
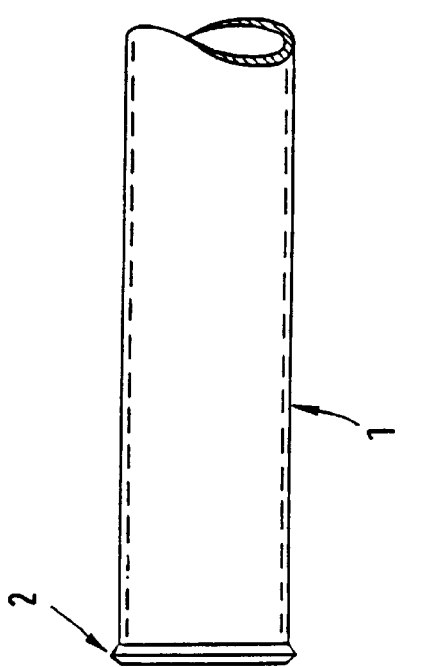
FIG. 1 is a view of the ends of the two pipes before they are joined together axially.
Figure 2:
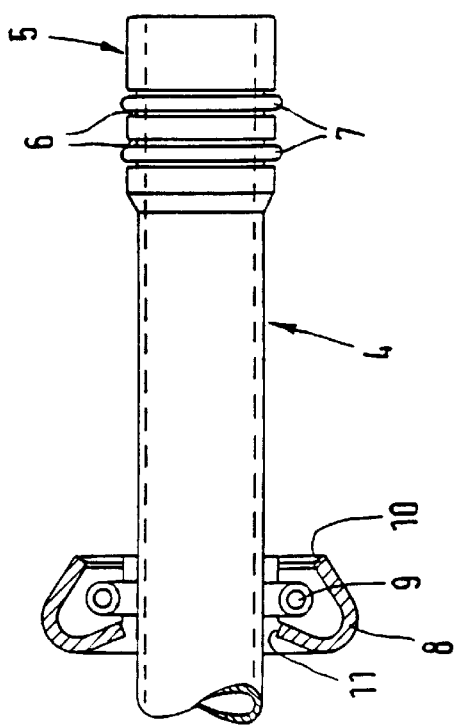
FIG. 2 shows the interconnected ends of the pipes with the annular helical spring latched.
Figure 2:
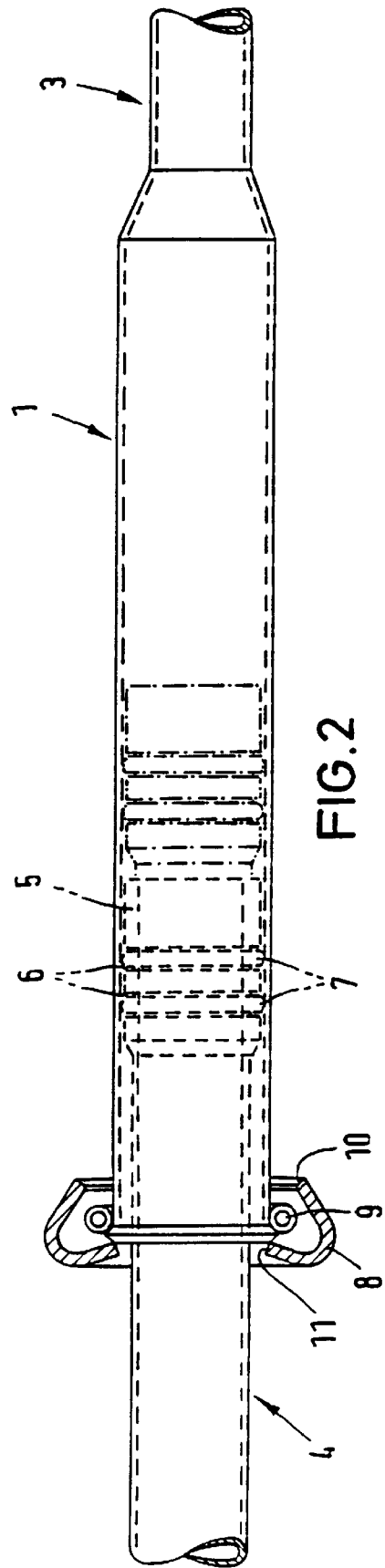

As shown in FIGS. 1 and 2, the union of two pipes comprises a receiving pipe 1 having at its free end a flange 2 and can optionally be provided further along with a narrower portion 3.

The entering pipe 4 is provided at its free end with an enlargement 5, in which grooves 6 are formed, generally by a special upsetting process, to receive conventional O-ring seals 7.

The external diameter of the enlargement 5 fits into the internal diameter of the receiving pipe 1 with a sliding fit.

Starting from the end of the entering pipe 4, after its enlargement 5, an axially slidable cage 8 is fitted on the pipe 4 which in known manner accommodates an annular helical spring 9. The annular cage 8 has an inlet opening 10, the diameter of which allows the unhindered entry of the flange 2 of the receiving pipe 1. The other diameter 11 of the annular cage 8 is only slightly larger than the external diameter of the pipe 4 and is a loose sliding fit thereon. This allows the cage 8 to slide axially along the length of the pipe 4.

Once the two pipes 1 and 4 have been slid axially into one another as shown in FIG. 2, the enlargement 5 can assume various axial positions within the receiving pipe 1 (one position being indicated in broken lines and another possible position in chain lines). By pushing the annular cage 8 over the flange 2 of the pipe 1 locking of the two pipes 1 and 4 is obtained insofar as the annular cage 8 is now connected to the pipe 1 by the outwardly expanded helical spring 9 and can only be separated from it by the use of a special tool. Furthermore, complete pulling apart is reliably prevented by the cage 8 coming to bear on the enlargement 5.

Unintended change in length of the two pipes can be prevented by the securing clip mentioned in German patent DE 19 513 058, corresponding to U.S. Pat. No. 5,738,384, assigned to the assignee of the present invention, the disclosure at column 2, line 15 to column 3, line 7 is hereby incorporated by reference.

Various modifications to the present invention will no doubt become apparent to those skilled in the art. It is the following claims, including all equivalents, which define the scope of my invention.

What is claimed is:

1. A quick-fitting coupling comprising:
   a first pipe having an enlarged end portion with a terminal end;
   an axially slidable annular cage means disposed on the end portion of the first pipe, the cage means including an annular chamber having a spring disposed therein, said spring being circumferentially disposed around said first pipe; and
   a second pipe for receiving said first pipe therein, said second pipe having an end portion including a flange portion circumferentially surrounding a terminal edge thereof, the flange portion being configured to receive the cage means when the first and second pipe ends are in engagement so that said spring circumferentially surrounds said flange portion to prevent telescopic disengagement of the second pipe from the first pipe when the first and second pipes are in engagement.

2. A quick-fitting coupling according to claim 1, further including sealing means disposed on the enlarged portion of the first pipe and between the end portion of the first pipe and the end portion of second pipe when said pipes are in engagement, for preventing leakage between the end portions.

3. A quick-fitting coupling according to claim 2, wherein said sealing means comprises a plurality of O-rings disposed in annular grooves circumferentially disposed around said enlarged end of said first pipe.

4. A quick-fitting pipe union for sealingly connecting overlapping ends of two pipes in which an axial end of a first pipe is inserted into an axial end of a second pipe, the quick-fitting pipe union comprising:

an annular cage axially slidably disposed on an outer side of the first pipe and fitted with an annular helical spring circumferentially disposed between the cage and the first pipe; and sealing means comprising annular grooves and O-ring seals disposed in said grooves in an enlargement at an end of said first pipe, wherein the annular cage carrying the annular helical spring and fitted on the first pipe is axially slidable on the outer circumference of the first pipe, whereby, when the first and second pipes are slid axially into one another, the annular cage with helical spring latches over a flange end of the second pipe and connects the two pipes together.

* * * * *